United States Patent Office 3,579,319
Patented May 18, 1971

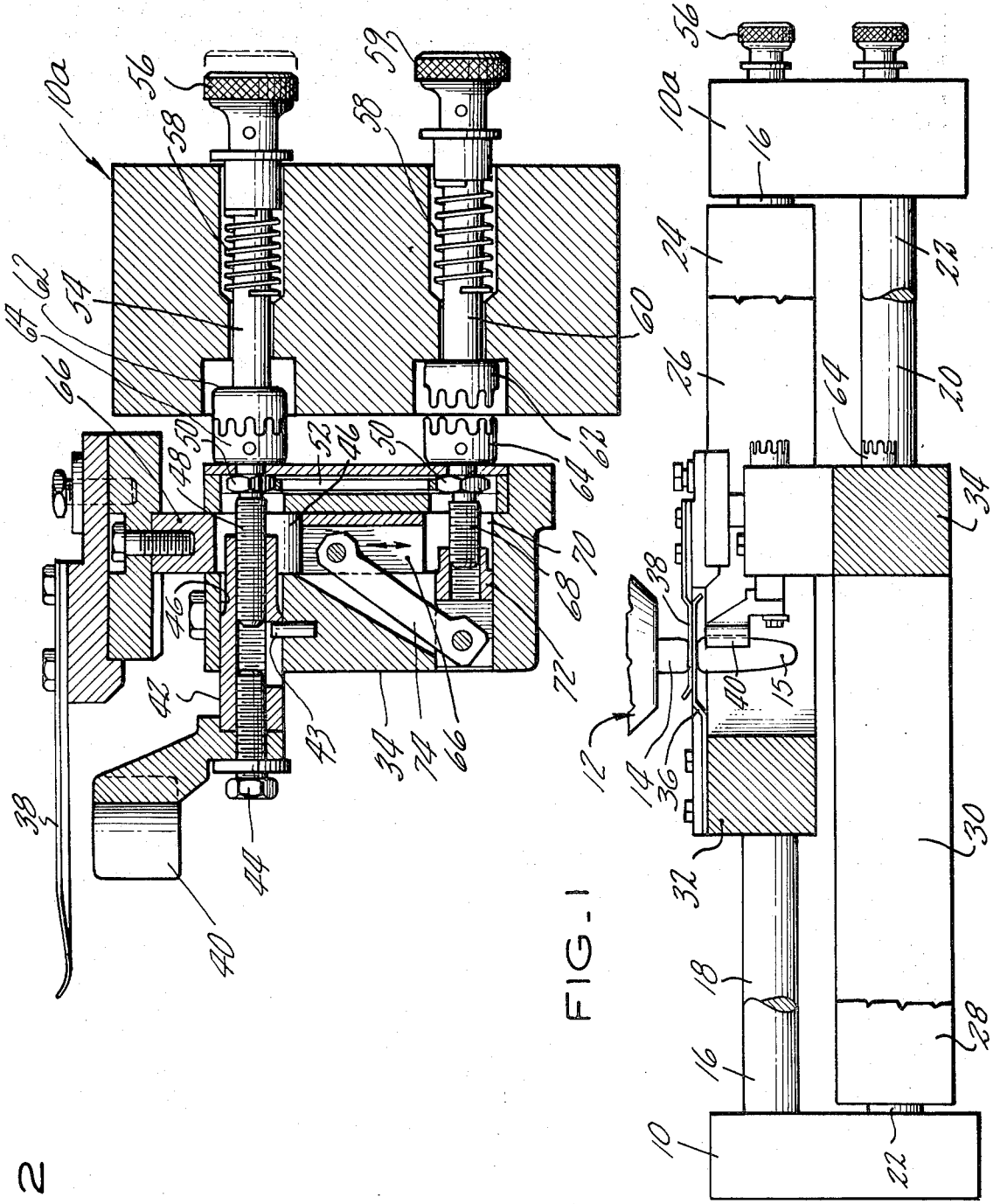

3,579,319
ADJUSTABLE SHEAR BLADE AND DROP GUIDE MOUNTING FOR MOLTEN GLASS STRAIGHT LINE SHEARS
Frederick J. Wythe, Hebron, and Harald Hoette, Farmington, Conn., assignors to Emhart Corporation, Bloomfield, Conn.
Filed Apr. 25, 1968, Ser. No. 723,985
Int. Cl. C03b 5/38
U.S. Cl. 65—334
7 Claims

ABSTRACT OF THE DISCLOSURE

A fixed frame for the shears is mounted beneath the outlet of a feeder bowl, and a pair of horizontally reciprocable carriages are mounted in the frame for movement in opposite directions, and carry opposed pairs of shear blades for severing gobs of glass from a plurality of suspended molten glass columns accumulated at said feeder bowl outlet. One blade in each pair is movably mounted in its associated carriage for vertical adjustment with respect to the other blade, and a hand operated adjustment knob carries a shaft which is slidable in the frame and its inner end is engageable with the blade mounting means when the carriage is retracted for accomplishing these adjustments during operation of the shears. A drop guide is also provided below each adjustable blade in each of said pairs of blades, and said drop guide is adjustable horizontally through another hand knob and shaft located above the shear blade adjusting knob.

SUMMARY OF THE INVENTION

This invention relates generally to apparatus for shearing by the straight line method a plurality of suspended columns of molten glass accumulated at the outlet spout of a feeder bowl, and deals more particularly with adjustable mounting means for at least one of the reciprocable shear blades in each pair of opposed blades which move horizontally toward and away from one another.

The general object of the present invention is to provide an apparatus of the foregoing character wherein the shear blade adjustment means permits at least minor adjustments to be made in the vertical height of at least one of the shear blades while the apparatus is in operation.

A further object of the present invention is to provide an apparatus of the foregoing character wherein the drop guide associated with the shear blades in each pair is independently adjustable toward and away from a suspended column of molten glass while the shearing apparatus is in operation.

BRIEF DESCRIPTION OF DRAWINGS

FIG. 1 is an elevational view partly in section of a straight line shearing apparatus incorporating the present invention. In this view both carriages are in position for shearing a gob of glass from a suspended column accumulated at the outlet of a feeder bowl.

FIG. 2 is a vertical sectional view of one of the reciprocable carriages associated with the straight line shearing apparatus of FIG. 1, showing the adjustable shear blade together with its associated adjustable drop guide, said carriage being shown in its retracted position with the drop guide undergoing adjustment.

DETAILED DESCRIPTION

Turning now to the drawing in greater detail, FIG. 1 shows a straight line shearing apparatus of the type described more particularly in a copending application entitled "Shears for Molten Glass Feeders," filed Apr. 24, 1967, under Ser. No. 633,257. Basically, the shear mechanism shown in FIG. 1 comprises a generally rectangular frame 10 which is mounted beneath the outlet spout of a feeder bowl 12 from which a plurality of suspended columns of molten glass 14 (one shown) are adapted to be formed in a conventional manner. The ends 10 and 10a of the frame support a plurality of guide tubes 16, 18 and 20, 22 which are hollow and carry hydraulic fluid to actuating cylinders 26 and 30 so that movable portions thereof are slidably received on the guide tubes for movement from and to the glass severing position shown in response to hydraulic pressure changes directed to the actuators as described more completely in the above-mentioned patent application.

For purposes of the present disclosure, it is sufficient to note that these actuates are arranged so as to reciprocate left and right hand carriages, 32 and 34 respectively, horizontally toward and away from one another so as to successively sever a plurality of suspended columns of molten glass to form gobs, as indicated generally at 15, for delivery to a mold in a glassware forming machine. Each of the carriages 32 and 34 is provided with shear blades, as indicated generally at 36 and 38 respectively, and these blades move toward each other from a retracted position to the closed, or "cut" position shown in FIG. 1. The facing edges of these blades 36 and 38 may be notched or otherwise formed so that they constitute a cutting or shearing edge for severing a suspended column of molten glass. A drop guide for the gob 15 of severed glass is provided, as indicated generally at 40, in order to guide the severed gob during its initial downward movement as it is being separated from the suspended molten glass column 14.

In accordance with the present invention, means is provided for adjustably mounting the right hand or upper shear blade 38 so as to permit its vertical position with respect to the right hand carriage 34 to be varied, thereby changing the tension provided between the left and right hand shear blades 36 and 38. It is an important feature of the present invention that this adjustment can be accomplished by non-reciprocable means provided for this purpose in the fixed frame 10a of the shearing apparatus, which means is selectively engageable with the reciprocable blade mounting means or carriage 34 so as to permit at least minor height adjustments to the right hand or upper shear blade 38 to be made while the shearing apparatus is in operation. It is a further feature of the present invention that means is provided for similarly adjusting the horizontal position of the drop guide 40.

Considering first the means for mounting the drop guide 40 to the right-hand carriage 34, said means comprises a horizontally slidable block 42 to which the drop guide 40 is secured by means of a screw 44. The slide block 42 is restrained by a pin 43 for slidable movement only in a horizontally extending cylindrical opening 46 provided for this purpose in the right hand carriage 34. The slide block 42 includes a threaded opening for threadably receiving a rotatable screw 48 which is rotatably supported in the carriage 34 and carries a hex nut 50 which is engaged by one leg of a C-shaped spring 52, which spring prevents inadvertent relative movement between the threaded screw 48 and the threaded bore in the slide block 42. As so constructed and arranged, rotation of the adjustment screw 48 achieves horizontal adjusting movement of the drop guide 40. As mentioned hereinabove, non-reciprocable means is provided in the fixed frame 10a for selectively engaging the drop guide adjusting screw 48 for making minor adjustments to the latter when the carriage 34 is in the retracted position shown in FIG. 2. Preferably, said last-mentioned means comprises a shaft 54 rotatably received in the fixed frame 10a and having a hand knob 56 provided at its right hand end with a compression spring 58 being provided to urge the shaft 54 from the position shown in full lines in FIG. 2 to that indicated in broken lines in that figure. A two-part separable coupling 62 and 64 is provided on the shaft 54 and on the adjusting screw 48 respectively so that pushing the knob 58 to the position shown in FIG. 2 places the adjust screw 48 in active engagement with the shaft 54 when the carriage is in its retracted position permitting horizontal adjustments to be made to the drop guide 40.

In further accordance with the present invention, means is provided for adjusting the vertical position of the upper shear blade 38 with respect to the right hand carriage 34, and hence with respect to the lower shear blade 36 through use of a shear blade adjust shaft 60 similar to the drop guide adjust shaft 54 just described. The shaft 60 is also adapted to be moved by a knob 59 against the bias of spring 58 from the inactive position shown to an active position wherein halves of the separable coupling, 62 and 64 are engaged, at least when the carriage 34 is in its retracted position. The means for adjustably mounting the shear blade 38 preferably comprises a vertically movable mounting block 66 which is slidably received in a vertically extending opening provided for this purpose in the right hand carriage 34. A shear blade adjust screw 68 is rotatably received in a horizontally extending opening 70 generally below the opening 46 associated with the drop guide adjust screw 48. A clevis nut 72 is threadably received on the shear blade adjust screw 68 and is slidably received in a horizontally extending opening 70 so as to be moved horizontally in response to rotation of the adjust screw 68 through manipulation of the hand knob associated with the shear blade adjust shaft 60 mentioned above. Linkage means in the form of a link 74 connects the nut 72 with the vertically movable mounting block 66 so that horizontal movement of the nut 72 is transmitted to the block 66 as vertical movement for adjusting the height of the right hand or upper shear blade 38 with respect to the lower blade 36 in the left hand carriage 32. The lower leg of the C-shaped spring 52 can be seen to engage a flat on the nut 50 associated with the blade adjust screw 68 so as to preclude inadvertent relative movement of the shear blade 38 during operation of the shearing apparatus.

In conclusion then, the above-described apparatus for adjustably mounting one of a cooperating pair of shear blades and their associated drop guide can be seen to provide an independent adjustment for a plurality of such shear blade pairs together with their associated drop guides, which is particularly useful in a straight line shears of the type described in the above-mentioned patent application wherein the pairs of shear blades are arranged in side-by-side relationship beneath a feeder bowl having a plurality of in-line orifices through which a plurality of molten glass columns are adapted to be fed for simultaneous severing.

We claim:

1. In a glass feeding apparatus having a downwardly open glass discharge outlet from which molten glass issues and accumulates in a least one suspended column and having severing means including at least one pair of horizontally reciprocable shear blades for severing a mold charge from the suspended column each time said blades move from retracted positions across the axis of said column, the improvement comprising reciprocable mounting means for one of said shear blades, said means permitting said one blade to be adjusted vertically with respect to the other, non-reciprocable means selectively engageable with said reciprocable mounting means for making minor height adjustments to said one blade with respect to the other shear blade in said pair when said one blade is in its retracted position, said means for adjustably mounting said one shear blade comprises horizontally reciprocable carriages, and a blade mounting block slidably received in vertically extending opening provided in one of said reciprocable carriages.

2. The combination defined in claim 1 wherein said means for adjustably mounting said one shear blade further includes an adjusting screw rotatably received in a horizontally extending opening in said one carriage, a nut threadably received on said screw and slidably received in said horizontal opening, and linkage means connecting said nut to said slide block whereby rotation of said screw causes vertical movement of said one shear blade.

3. The combination defined in claim 2 wherein said non-reciprocable means comprises a fixed frame in which said horizontally reciprocable carriages are mounted, a shear blade adjust shaft rotatably mounted in said frame and slidable axially between active and inactive positions, and means for coupling said shear blade adjust shaft to said screw when said shaft is in said active position and when said one carriage is in its retracted position.

4. The combination defined in claim 1 and further characterized by a severed mold charge drop guide for guiding the glass, and means for mounting said drop guide to said reciprocable shear blade mounting for reciprocable movement therewith, said drop guide mounting means being adjustably connected to said blade mounting means to permit horizontal adjustments of said drop guide with respect to said one blade, non-reciprocable means selectively engageable with said drop guide mounting means for making minor adjustments to said drop guide position when said one blade and said drop guide are in their retracted positions, said means for adjustably mounting said drop guide comprising at least one horizontally reciprocable carriage, and an adjusting screw rotatably received in a horizontally extending opening in said carriage, and a nut threadably received on said screw and slidably received in said opening, said nut supporting said drop guide for horizontal adjusting movement in response to rotation of said screw.

5. The combination defined in claim 3 wherein said non-reciprocable means comprises a fixed frame in which said horizontally reciprocable carriage is mounted, a drop guide adjust shaft rotatably mounted in said frame and slidable axially between active and inactive positions, and means for coupling said drop guide adjust shaft to said screw when said shaft is in said active position and when said carriage is in its retracted position.

6. The combination defined in claim 4 wherein said means for adjustably mounting said one shear blade comprises a blade mounting block slidably received in a vertically extending opening provided in said carriage, and a shear blade adjust screw rotatably received in a horizontally extending opening below said opening for said drop guide adjust screw, a nut threadably received on said shear blade adjust screw and slidably received in said upper opening, and linkage means connecting said nut to said slide block whereby rotation of said shear blade adjust screw causes vertical movement of said blade.

7. The combination defined in claim 6 wherein said non-reciprocable means for making minor adjustments to said one shear blade height comprises a shear blade adjust shaft rotatably mounted in said frame above said drop guide adjust shaft, said blade adjust shaft slidably mounted for limited axial movement between active and inactive positions in said frame, and means for coupling said blade adjust shaft to its associated screw when said shaft is in its active position and when said carriage is in its retracted position.

References Cited

UNITED STATES PATENTS

| | | | |
|---|---|---|---|
| 2,678,518 | 5/1954 | Honiss | 83—600 |
| 2,812,619 | 11/1957 | Wythe | 65—334 |

HOWARD R. CAINE, Primary Examiner

R. L. LINDSAY, Jr., Assistant Examiner

U.S. Cl. X.R.

65—133; 83—623, 700